United States Patent
Mishra et al.

(10) Patent No.: US 8,620,776 B1
(45) Date of Patent: Dec. 31, 2013

(54) SELF HEALING ANDON SYSTEM AND METHOD

(75) Inventors: Devesh Mishra, Snoqualmie, WA (US);
Eric C. Young, Mercer Island, WA (US);
Sameer Vinod Shah, Seattle, WA (US);
Timothy Jesse Tien, Seattle, WA (US);
Jun Zhao, Bellevue, WA (US)

(73) Assignee: Amazon Technologies, Reno, NV (US)

( * ) Notice: Subject to any disclaimer, the term of this patent is extended or adjusted under 35 U.S.C. 154(b) by 0 days.

(21) Appl. No.: 13/487,437

(22) Filed: Jun. 4, 2012

Related U.S. Application Data (63) Continuation of application No. 12/329,944, filed on Dec. 8, 2008, now Pat. No. 8,195,533.

(51) Int. Cl.
*G06Q 10/00* (2012.01)

(52) U.S. Cl.
USPC ............. 705/28; 700/109; 700/102; 700/104; 700/121; 700/108; 705/22; 705/26.3; 705/7.37; 705/37; 705/14.35; 705/14.36; 705/40; 705/30; 705/7.29; 705/7.12; 705/7.31

(58) Field of Classification Search
USPC .......................................................... 705/28
See application file for complete search history.

(56) References Cited

U.S. PATENT DOCUMENTS

| | | | |
|---|---|---|---|
| 6,611,728 B1 | 8/2003 | Morioka et al. | |
| 7,103,505 B2 | 9/2006 | Teshima et al. | |
| 7,349,838 B2 | 3/2008 | Summers | |
| 2003/0158795 A1 | 8/2003 | Markham et al. | |
| 2003/0216969 A1 | 11/2003 | Bauer et al. | |

OTHER PUBLICATIONS

Diss. Hess, Paul C. Bureaucracy and total quality management: A sociological theory of clashing systems, moralities, and knowledge methods. Brandeis University, ProQuest, UMI Dissertations Publishing, 2006. 3221438.*
U.S. Appl. No. 12/329,944 entitled "Self Healing Andon System and Method," filed Dec. 8, 2008.
Kumar, Sameer Harms, Ralph. Improving business processes for increased operational efficiency: a case study. 2004. Journal of Manufacturing Technology Management, v15n7, p. 662-674.

* cited by examiner

*Primary Examiner* — Ryan Zeender
*Assistant Examiner* — Fawaad Haider
(74) *Attorney, Agent, or Firm* — Thomas | Horstemeyer, LLP (57) ABSTRACT

Disclosed are various embodiments of a self healing andon system. One embodiment of the present disclosure includes a system comprising at least one server. The system further includes logic executed on the at least one server that retrieves a defect history associated with a vendor and at least one product from an inbound shipment from a memory. The at least one product is stocked in a materials handling facility, and the defect history is associated with a specified time period. The at least one server extracts at least one inventory defect from the defect history in a computer system and calculates an inventory defect rate. The at least one server imposes remedial measures if the inventory defect rate exceeds a specified threshold of the inventory defect rate.

21 Claims, 5 Drawing Sheets

SELF HEALING ANDON SYSTEM AND METHOD

CROSS REFERENCE TO RELATED APPLICATIONS

This application is a continuation of co-pending U.S. patent application Ser. No. 12/329,944 filed Dec. 8, 2008 and entitled "Self-Healing Andon System and Method," which is hereby incorporated by reference in its entirety.

BACKGROUND

Fulfillment centers, warehouses, and other materials handling centers often receive inbound shipments from vendors or other suppliers. Inventory defects can occur that are caused by vendors or other suppliers violating shipping guidelines, shipping damaged or defective items, and the like. Materials handling facility personnel can also cause inventory defects when sorting and/or stocking inventory received in an inbound shipment.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
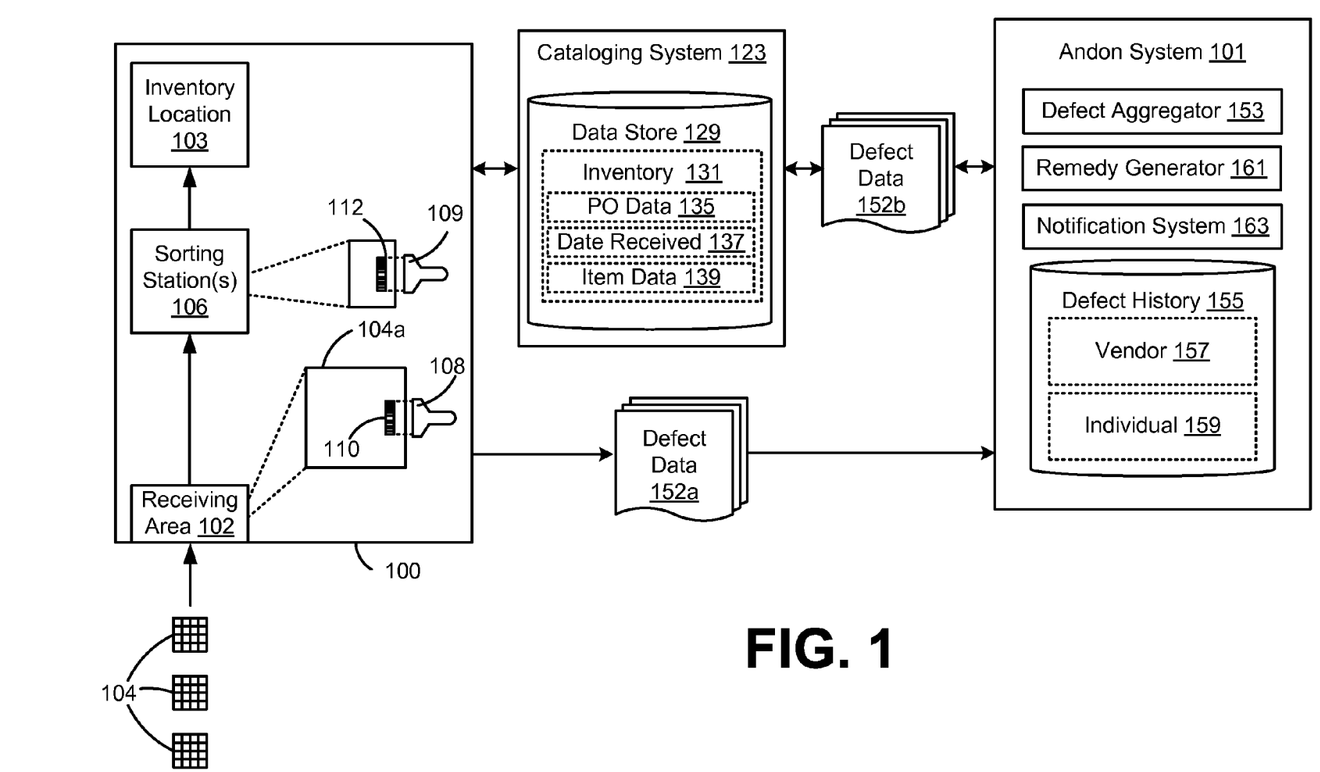
FIG. 1 is a drawing of a networked environment including a cataloging system and an andon system within a materials handling facility with an embodiment of the disclosure.

With reference to FIG. 1, shown is a drawing that depicts one example of a materials handling facility 100 that includes various systems that are in communication with an andon system 101 according to an embodiment of the present disclosure. A materials handling facility 100 may include one or more of, but is not limited to, warehouses, distribution centers, cross-docking facilities, order fulfillment centers (also referred to as fulfillment facilities), packaging facilities, shipping facilities, or other facilities or combination of facilities for performing one or more functions of material (inventory) handling. Although the materials handling facility 100 is described herein with specific reference to a fulfillment center, it is understood that a materials handling facility 100 provides one example of many other types of environments to which the principles described herein apply.

According to the illustration provided herein, the materials handling facility 100 may comprise, for example, a large warehouse or other structure that includes at least one receiving area 102 where inbound shipments 104 that contain inventory and/or products from vendors can be received. The materials handling facility can also include at least one sorting station 106 where inventory in an inbound shipment 104 can be examined, sorted, counted, and routed to various inventory locations 103 in the materials handling facility 100. Inventory locations 103 can include various bins, slots, shelves, containers, receptacles, crates, stalls, cribs, cordoned areas, or other locations, etc. where inventory can be stored and/or stocked for later retrieval. An inventory of items received in the receiving area 102 is stored in the inventory locations 103 after items are received in the receiving area 102 and sorted in a sorting station 106.

In the materials handling facility 100, it should also be appreciated that shipment errors can be committed by vendors shipping inbound shipments 104 to the materials handling facility 100. Receiving errors and/or sorting errors can also be committed by individuals or personnel receiving and/or sorting items in the receiving area 102 and sorting station 106. Such errors can be a cause of inefficiency and increase the costs associated with inventory handling and/or management. These errors can also be referred to as inventory defects. An inventory defect committed by a vendor can refer to a parcel defect or anomaly such as a damaged package or product, late arriving inventory, improperly loaded shipping container and/or pallet, defective tracking information such as inaccurate, inconsistent, missing, or illegible purchase order (PO), shipment identifier, vendor information, universal product code, stock-keeping unit, or other shipment errors. An inventory defect can also refer to errors committed by stocking personnel or an individual in the materials handling facility 100, such as an inaccurate counting and/or sorting of inventory received at the receiving area 102 in an inbound shipment, or inventory lost from an inbound shipment.

Accordingly, one embodiment of an andon system 101 according to the disclosure can track and store such inventory defects over time and determine whether certain vendors and/or materials handling facility 100 personnel are the cause of such defects to a degree that exceeds a specified and configurable threshold. The andon system 101 can also impose appropriate and stepwise escalating remedial measures on a vendor and/or personnel if a threshold is exceeded. Accordingly, the andon system 101 can calculate an inventory defect rate over a specified time period to determine whether a vendor or materials handling facility 100 personnel violate performance standards that can be expressed in terms of a number of allowable inventory defects over a period of time. In one exemplary embodiment, the andon system 101 can be configured to allow a certain number of inventory defects committed by a vendor over a specified time period. If the vendor exceeds a threshold number of defects over the specified time period, the andon system 101 can, as a remedial measure, cause the materials handling facility 100 to cease acceptance of further inbound shipments 104 from the vendor or take other appropriate action.

In the case of an inventory defect committed by materials handling facility 100 personnel, the andon system 101 can impose remedial measures on an individual working in the materials handling facility 100. Like the above example, the andon system 101 can track an inventory defect rate over a specified time period that is associated with a particular individual. If the individual exceeds an inventory defect rate threshold during a specified time period, the andon system 101 can impose remedial measures. For example, the andon system 101 can determine whether certain personnel are responsible for an unacceptably high volume of miscounted and/or misplaced inventory and, as a remedial measure, instruct the individual to cease sorting and/or receiving inventory and seek assistance and/or further training or assistance from management or other personnel in order to reduce the inventory defect rate associated with the individual. Additional examples of operation of the andon system 101 with respect to a vendor and materials handling facility 100 personnel are discussed in further detail hereinbelow.

Next is a discussion of the operation of the materials handling facility 100 in conjunction with various systems that facilitate receiving of inventory from inbound shipments 104. An inbound shipment 104 containing inventory can be received into a materials handling facility 100 in a receiving area 102. A shipping container, packaging, pallet or other enclosure can be shipped from a vendor or other supplier supplying inventory to the materials handling facility 100. The receiving area 102 can facilitate receipt of the inbound shipment 104, where it can be subsequently sorted at one or more sorting stations 106 and stocked in the materials handling facility 100 in inventory locations 103.

In addition, at least one input device 108, 109 can be employed in the receiving area 102 and/or sorting station 106 to allow materials handling facility 100 personnel to input shipment identifiers 110 and/or product identifiers 112 that can be transmitted to a cataloging system 123 that can be employed to track inventory received by and stocked within the materials handling facility 100. The functionality of the cataloging system 123 is discussed in further detail below. With reference again made to the depicted non-limiting exemplary receiving area 102, an input device 108 can be implemented as a bar code scanner that can scan a bar code configured as the shipment identifier 110, which can be associated with a purchase order, tracking data, or other information about the inbound shipment 104 that can be transmitted to the cataloging system 123. The input device 108 may comprise other components, including, but not limited to, a scanner, camera, keyboard, microphone, pointing device, or any device coupled to a computing system. It should also be appreciated that other information about the shipment can be embedded in the bar code and can include, but is not limited to, shipment contents, weight, volume, and other data that should be appreciated.

Accordingly, if there are inventory defects detected at the receiving area 102, they can be noted by materials handling facility 100 personnel and/or be automatically detected upon the entering of a shipment identifier 110 into the input device 108. As a non-limiting example, if an inbound shipment 104 has a missing, illegible, or damaged shipment identifier 110 that cannot be detected by the input device 108, then materials handling facility 100 personnel can note that an inventory defect should be associated with a shipment from the vendor supplying the inbound shipment 104. As an alternative example, if an inbound shipment 104 is improperly packaged (e.g., unsafe loading of shipping container, pallet, etc., damaged shipment, etc.), an inventory defect can be generated and associated with the sending vendor. As yet another alternative example, if, upon entry of a shipment identifier 110 via the input device 108, it is detected that the inbound shipment 104 has been shipped to a wrong location, then an inventory defect can be automatically generated and associated with the sending vendor. Such an inventory defect can also be considered a shipment level inventory defect, as it is associated with an inbound shipment 104 and not merely with inventory within the shipment.

A sorting input device 109 can also be used in conjunction with a sorting station 106 to facilitate examination, sorting, and stocking of inventory items from an inbound shipment 104. In one embodiment, the sorting input device 109 can be a bar code scanner configured to scan a product identifier 112 and input the product identifier 112 into the cataloging system 123. The product identifier 112 may comprise, for example, a Universal Product Code (UPC), Global Trade Item Numbers (GTIN), European Article Number (EAN), International Standard Serial Number (ISSN), International Standard Book Number (ISBN), or other type of identifier. The sorting input device 109 may comprise, for example, a scanner, camera, keyboard, microphone, pointing device, or any input device coupled to a computing system.

An inventory defect can be detected by materials handling facility 100 personnel or automatically detected upon inputting of the product identifier 112. In one embodiment, materials handling facility 100 personnel can detect that an item from an inbound shipment 104 has a missing, damaged, and/or illegible product identifier label affixed on the product. Similarly, if materials handling facility 100 personnel detect that a scanned product identifier 112 does not match a product to which it is affixed or a purchase order to which it is associated, an inventory defect can be detected by the personnel. As an additional non-limiting example, if an invalid product identifier is detected when a product identifier 112 is scanned by the input device, an inventory defect can be automatically detected by the input device 109 and associated with the sending vendor.

The materials handling facility 100 can be integrated with or communicate with one or more systems to facilitate receiving, stocking and cataloging of inbound shipments 104. The cataloging system 123 can facilitate receipt and tracking of inventory received from inbound shipments 104. In one non-limiting example, the cataloging system 123 can include a data store 129 in which data regarding inventory and inbound shipments 104 received by the materials handling facility 100 can be stored. Product records containing information about inventory can be stored in an inventory table 131 that can also include purchase order data 135, date received data 137, and other item data 139 such as whether the received item is damaged, etc., and other data that should be appreciated. It should also be appreciated that the above structure of the data store 129 is but one example and that various alternative structures or hierarchies can be used to store and manipulate the same or similar information pertaining to products, inventory, purchase orders and other data that should be appreciated to facilitate the functions of the cataloging system 123. Further, it should also be appreciated that additional or alternative information may be stored within the data store 129 in accordance with various embodiments of the disclosure.

As noted above, inbound shipments 104 can be received at the receiving area 102 and a shipment identifier 110 or other identifying feature can be scanned with an input device 108. A shipment identifier 110 can be associated with a purchase order, shipment tracking data or other information that can be communicated to the cataloging system 123. The input device 108 can transmit a shipment identifier 110 to the cataloging system 123, which can store information regarding the inbound shipment 104 in the data store 129 and log the inbound shipment 104 as received. In addition, the cataloging system 123 can be configured with information regarding inbound shipments 104 that are expected to arrive from various vendors. Accordingly, the cataloging system 123 can automatically detect an inventory defect if shipment identifiers 110 associated with information about an inbound shipment 104 that are transmitted to the cataloging system 123 by the input device 108 are inconsistent with information accessible to the cataloging system 123 regarding expected inbound shipments 104 from vendors.

When inventory in an inbound shipment 104 is sorted at a sorting station 106, a product identifier 112 can be scanned by the input device 109. A product identifier 112 can be transmitted to cataloging system 123, which can store information regarding the product associated with the product identifier 112 in the data store 129 and log the item as received. In addition, because the cataloging system 123 has access to information regarding a purchase order and/or shipment identifier 110 associated with a received item, as an inbound shipment 104 is sorted, the cataloging system 123 can determine whether there are any underages and/or overages. If there are underages and/or overages, the cataloging system 123 can detect an inventory defect and associate the defect with a vendor associated with the inbound shipment 104. Alternatively, the cataloging system 123 can provide information regarding inventory and inbound shipments 104 to other systems so that inventory defects can be detected.

In this way, the cataloging system 123 can store data regarding the inventory stored in inventory locations 103 of the materials handling facility 100 as well as track data regarding inbound shipments 104 containing inventory to be stocked in the materials handling facility 100.

Accordingly, the andon system 101 can work in conjunction with the materials handling facility 100, personnel within the materials handling facility 100, and the cataloging system 123 in order to track inventory defects as well as impose remedial measures in order to reduce inventory defects occurring within the materials handling facility 100 and by vendors sending inbound shipments 104 to the facility. Defect data 152 containing information about the inventory defect can be transmitted from the materials handling facility 100 and/or the cataloging system 123 to the andon system 101 for storage and/or processing. The defect aggregator 153 can receive and cause the defect data 152 to be stored within a defect history 155 data store. The defect history 155 can also include various tables for storing defect data 152 associated with an inventory defect. The defect history 155, in one embodiment, can include a vendor table 157 and an individual table 159. The vendor table 157 can store inventory defects associated with vendors sending inbound shipments 104 to the materials handling facility 100. The individual table 159 can store inventory defects associated with materials handling facility 100 personnel.

Following is a discussion of how the andon system 101 can, in one embodiment, aggregate and address such inventory defects. For example, certain guidelines and/or rules can be imposed on vendors supplying inventory via inbound shipments 104 in order to increase efficiency of the materials handling facility 100 as well as to reduce the cost of operating the same. As a non-limiting example, guidelines can be imposed on a vendor supplying inventory regarding the type, size, weight, volume, packaging density and other characteristics of shipping container, pallet or other enclosure that may be included in an inbound shipment 104.

In one example, a guideline can be imposed that requires a vendor to supply inbound shipments 104 sent on shipping pallets loaded at a maximum height to provide for safe and efficient unloading at the materials handling facility 100. As another example, a maximum weight per shipment guideline can be imposed on a vendor supplying inventory to the materials handling facility 100. Other such guidelines and/or rules that can be imposed on vendors supplying inventory should be appreciated. Therefore, in the above non-limiting example, if an inbound shipment 104 from a vendor violates shipment guidelines and/or policies, a shipment level inventory defect can be generated by personnel within the receiving area 102 of the materials handling facility 100. The inventory defect can be generated by receiving area 102 personnel and can be facilitated by input device 108 or other computing system in communication with the cataloging system 123 and/or andon system 101.

An inventory defect can also be automatically detected by the defect aggregator 153 and/or provided by the cataloging system 123. Accordingly, the defect aggregator 153 can extract defect data 152 from the cataloging system 123 based on various factors. In one example, the andon system 101, based on the shipping identifier 110, purchase order identifier, or other data associated with an inbound shipment 104 received at the receiving area 102, can detect whether a shipment level inventory defect has occurred based upon the data stored within the cataloging system 123. The defect aggregator 153 can then generate an inventory defect and store defect data 152 in the defect history 155. For example, the defect aggregator 153 can detect a shipment level inventory defect if a purchase order identifier is wrong or other identifying information is inconsistent with expected shipments from a vendor by retrieving such information from the cataloging system 123.

The defect data 152 either generated by or transmitted to the andon system 101 can include information about the inventory defect, which can include, but is not limited to: inventory defect date, associated vendor, purchase order, shipping identifier 110, associated materials handling facility 100 personnel, product identifier 112 and other information as can be appreciated to be associated with such an inventory defect.

After an inbound shipment 104 is received in the receiving area 102, inventory in the inbound shipment 104 can be sorted in the sorting station 106 and stored in inventory locations 103. As noted above, inventory defects may occur in the sorting station 106 that are caused by materials handling facility 100 personnel. Alternatively, inventory defects can be caused by a vendor sending an inbound shipment 104 and detected in the sorting station 106. An individual in the materials handling facility 100 can detect an item level inventory defect in the sorting station 106 and cause defect data 152 to be transmitted to the andon system 101. The input device 109 or other computing system can facilitate transmission of the defect data 152 to the andon system 101.

As a non-limiting example, if sorting station 106 personnel notice damaged inventory when sorting and stocking an inbound shipment 104, the individual can generate an inventory defect associated with the vendor and cause defect data 152 containing information about the defect to be transmitted to the andon system 101, where the defect aggregator 153 can cause the defect data 152 to be stored in the defect history 155. As an additional example, inventory in an inbound shipment 104 may lack a product identifier 112 affixed thereon. Accordingly, sorting station 106 personnel can generate a corresponding item level inventory defect associated with the vendor and cause defect data 152 to be transmitted to the defect aggregator 153 of the andon system 101.

As noted above in reference to a shipment level inventory defect, an item level defect can also be automatically detected by the cataloging system 123 or by the andon system 101 using information stored in the data store 129 of the cataloging system 123. As a non-limiting example, if inventory received in an inbound shipment 104 is not associated with a purchase order identifier and/or shipment identifier 110 associated with the inbound shipment 104, then the cataloging system 123 and/or the andon system 101 can generate an inventory defect and cause the defect aggregator 153 to store the defect data 152 associated with the inventory defect in the defect history 155. Other inventory defects that can be generated by materials handling facility 100 personnel as well as automatically detected should be appreciated.

Therefore, the andon system 101 can track inventory defects associated with a vendor shipping inbound shipments 104 and/or personnel in the materials handling facility 100 in the defect history 155. An inventory defect rate can be calculated over a specified period of time that is associated with a vendor and/or personnel. Accordingly, an inventory defect rate threshold can be established for the specified time period that defines a maximum defect rate for a vendor and/or personnel. If the calculated inventory defect rate exceeds a specified and configurable threshold, then remedial measures can be imposed by the remedy generator 161 of the andon system 101.

The remedy generator 161 is configured to generate a remedy and/or corrective action in response to an inventory defect as well as impose remedial measures in response to a single inventory defect and/or an inventory defect rate exceeding specified threshold for a specified time period. Certain inventory defects can be remedied and/or resolved without human intervention. Accordingly, the remedy generator 161 can facilitate correction of an inventory defect by the cataloging system 123 and/or materials handling facility 100 by automatically generating corrective action. As a non-limiting example, if an item received in the materials handling facility 100 lacks a product identifier 112 containing a universal product code, the remedy generator 161 can facilitate printing of a new product identifier 112 that can be placed on the inventory being sorted at the sorting station 106.

In addition, the remedy generator 161 can be configured to impose remedial measures on a vendor and/or individual associated with an inventory defect rate exceeding a specified threshold over a specified time period. In the case of a vendor that ships inbound shipments 104 to the materials handling facility 100, the andon system 101 can track inventory defects associated with the vendor and cease acceptance of shipments or restrict the quantity of products ordered from the vendor if the inventory defect rate exceeds a specified threshold. Alternatively, if a vendor and/or individual has exceeded a gross number of inventory defects over a specified time period, remedial measures can likewise be imposed by the remedy generator 161.

As another example, the andon system 101 can issue a warning message to the vendor, materials handling facility 100 personnel, management, and/or other entities via the notification system 163 that an inventory defect rate threshold has been exceeded. As yet another example, the remedy generator 161 can cause the andon system 101 to more closely track a vendor and/or individual exceeding an inventory defect rate over a specified time period relative to other vendors and/or individuals. For example, a vendor exceeding an inventory defect rate threshold can be tracked according to a lower inventory defect rate threshold relative to other vendors, or at more frequent intervals relative to other vendors. In a non-limiting example of an individual in a materials handling facility 100, if an individual in the facility exceeds a threshold inventory defect rate over a specified time period, then the remedy generator 161 can be configured to notify the individual via the notification system 163 that he/she should cease activities in the facility and seek assistance from other personnel and/or management.

In addition, the remedy generator 161 can impose increasingly harsher remedial measures on a vendor and/or individual that has previously exceeded an inventory defect rate for a previous time period. As a non-limiting example, if a vendor has exceeded an inventory defect rate threshold, the remedy generator 161 can interface with a procurement system or other system facilitating the ordering of products to cause the procurement system to cease the ordering of products from the vendor or restrict the quantity of products ordered from the vendor.

Because certain types of inventory defects may have differing remediation costs or another measure of importance associated therewith, the andon system 101 can also assign a weighting factor to certain inventory defects stored in the defect history 155. As a non-limiting example, if the remediation cost to cure a particular inventory defect is higher relative to other inventory defects, then such a defect can be assigned a higher weighting factor than other inventory defects in the defect history 155, thereby giving the defect higher weight when calculating an inventory defect rate over a specified time period.

The notification system 163 can work in conjunction with the remedy generator 161 to notify vendors and materials handling facility 100 personnel of remedial measures the remedy generator 161 has imposed. In addition, the notification system 163 can generate informational notifications regarding an inventory defect or inventory defect rate associated with a vendor and/or personnel. The notification system 163 can also generate internal notifications, which can be sent to supervisory, management or other personnel regarding the status of inventory defects, inventory defect rates, or other information about the materials handling facility 100, inbound shipments 104, remedial measures imposed on a vendor and/or inventory, and other information as can be appreciated.

Figure 2:
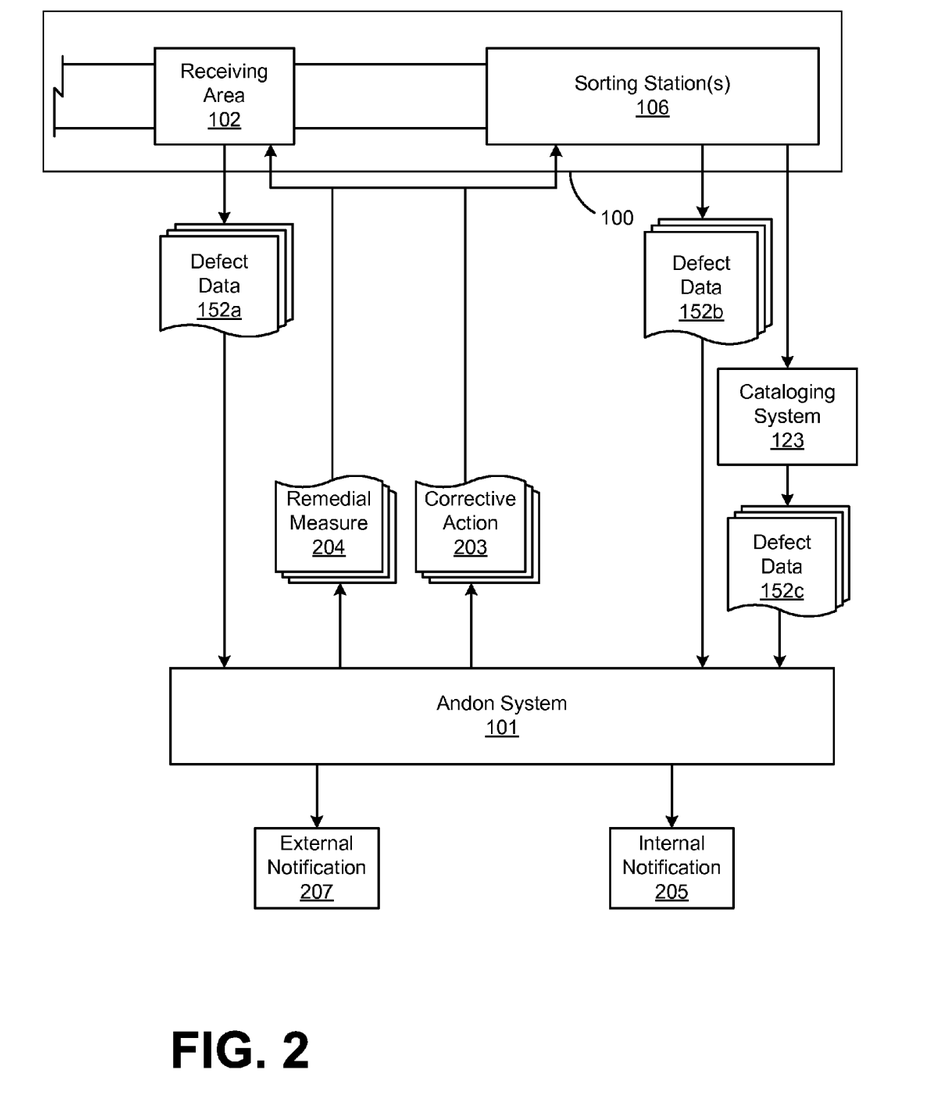
FIG. 2 is an alternative depiction of the materials handling facility of FIG. 1.

With reference to FIG. 2, shown is a drawing that depicts one example of a materials handling facility 100 according to an embodiment of the present disclosure. FIG. 2 depicts the materials handling facility 100, and a receiving area 102 and at least one sorting station 106 therein. The inventory locations 103 (FIG. 1) are not shown. Also shown is the cataloging system 123 in communication with the materials handling facility 100. The andon system 101 is depicted in communication with the cataloging system 123 and the materials handling facility 100. FIG. 2 depicts one example of the andon system 101 handling at least one inventory defect and/or inventory defect rate in which corrective action 203 can be generated by the andon system 101.

In the depicted example, the receiving area 102 receives an inbound shipment 104 (FIG. 1) for which there is a user generated shipment level inventory defect. Accordingly, defect data 152a can be transmitted to the andon system 101 from the user generated inventory defect. It should be noted that in the depicted example, defect data 152a regarding the user generated inventory defect is not transmitted to the cataloging system 123. However, it should be appreciated that in some embodiments, such defect data 152a can be transmitted to, extracted from, and stored within the cataloging system 123.

In the depicted example, the sorting station 106 receives inventory from an inbound shipment 104 for which an item level inventory defect is generated by a user. Accordingly, corresponding defect data 152b is generated by materials handling facility 100 personnel, and is transmitted to the andon system 101. As noted above, it should again be mentioned that in the depicted example, defect data 152 regarding the user generated inventory defect is not transmitted to the cataloging system 123. However, it should be appreciated that in some embodiments, such defect data 152b can be transmitted to, extracted from and stored within the cataloging system 123.

FIG. 2 further depicts the cataloging system 123 receiving data from the sorting station 106. As noted above, the cataloging system 123 can receive data from the materials handling facility 100 regarding inbound shipments 104 and inventory to be sorted and stocked therein. The cataloging system 123 can receive data from input devices and/or other systems present in the materials handling facility 100 configured to transmit inventory and/or shipment data. In addition, in the depicted example, because the andon system 101 is in communication with the cataloging system 123, the andon system 101 can extract inventory defect 152c from the cataloging system 123.

FIG. 2 depicts the andon system 101 generating and transmitting corrective action 203 to the materials handling facility 100 in response to receiving the above noted exemplary defect data 152a, 152b, 152c corresponding to inventory defects. The corrective action 203 can include information regarding how to address one or more inventory defects occurring within the materials handling facility 100. The corrective action 203 can be automatically generated or generated in response to human intervention. As noted above, certain inventory defects can be remediated by the andon system 101 without human intervention, however, the inventory defect can be generated and stored within the defect history 155 (FIG. 1) for calculating an inventory defect rate associated with a vendor and/or materials handling facility 100 personnel.

In addition, the andon system 101 is configurable such that remedial measures 204 are generated by the andon system 101 and transmitted to the materials handling facility 100 in response to inventory defects. As noted above, remedial measures 204 can include measures taken in response to an inventory defect and/or an inventory defect rate exceeding a specified threshold in a specified time period.

The andon system 101 further generates the depicted internal notification 205 in response to defect data 152a, 152b, 152c associated with inventory defects. The internal notification 205 can include information regarding the inventory defects and can be transmitted to management, supervisory, or other personnel for further handling. The external notification 207 can be transmitted to a vendor and/or materials handling facility 100 personnel to notify the same of exceeding an inventory defect rate threshold and/or regarding specific inventory defects.

Figure 3A:
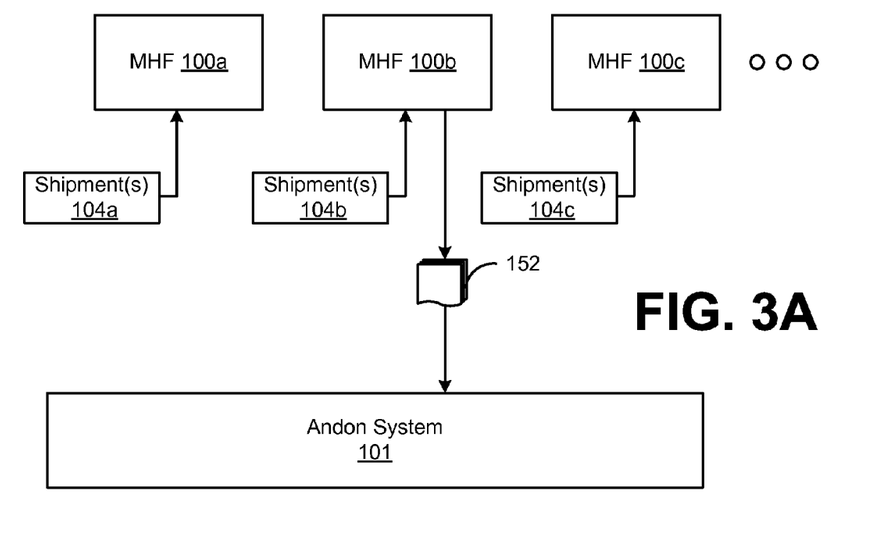
FIG. 3A is a drawing of a networked environment including a plurality of materials handling facilities in communication with an andon system in accordance with an embodiment of the disclosure.

With reference to FIG. 3A, shown is one example of an andon system 101 in communication with a plurality of materials handling facilities 100. The andon system 101 can manage and/or address inventory defects occurring in multiple materials handling facilities 100 so that efficiency of receipt of inbound shipments 104 is maximized. In the depicted example, materials handling facility 100b generates an inventory defect, and corresponding defect data 152 is transmitted to the andon system 101. If the andon system 101 determines that the defect represented by the defect data 152 has a great enough severity, or that the inventory defect rate associated with the materials handling facility 100b has exceeded a specified threshold, the andon system 101 can reroute inbound shipments 104b intended for the materials handling facility 100b.

Figure 3B:
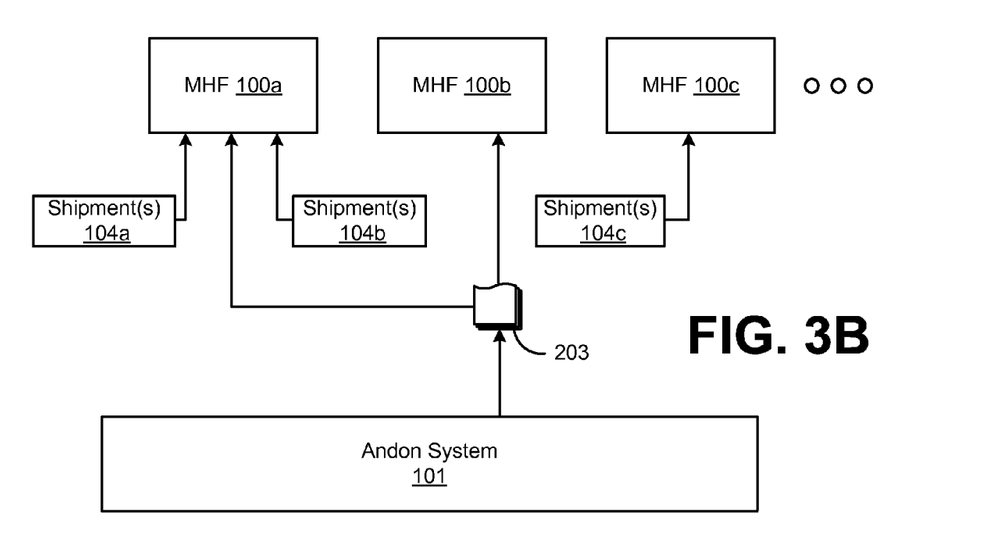
FIG. 3B is an alternative depiction of the networked environment of FIG. 3A.

Accordingly, reference is now made to FIG. 3B that depicts the andon system 101 generating corrective action 203 to the materials handling facilities 100a, 100b, instructing the materials handling facility 100b to cease acceptance of inbound shipments 104b, and causing inbound shipments 104b to be rerouted to the materials handling facility 100a. As another non-limiting example, the andon system 101 can reroute a subset of inbound shipments 104b, or take other corrective action 203 and/or remedial measures 204 as can be appreciated. In this way, the andon system 101 can manage a plurality of materials handling facilities 100 and inventory defects generated therein.

Figure 4:
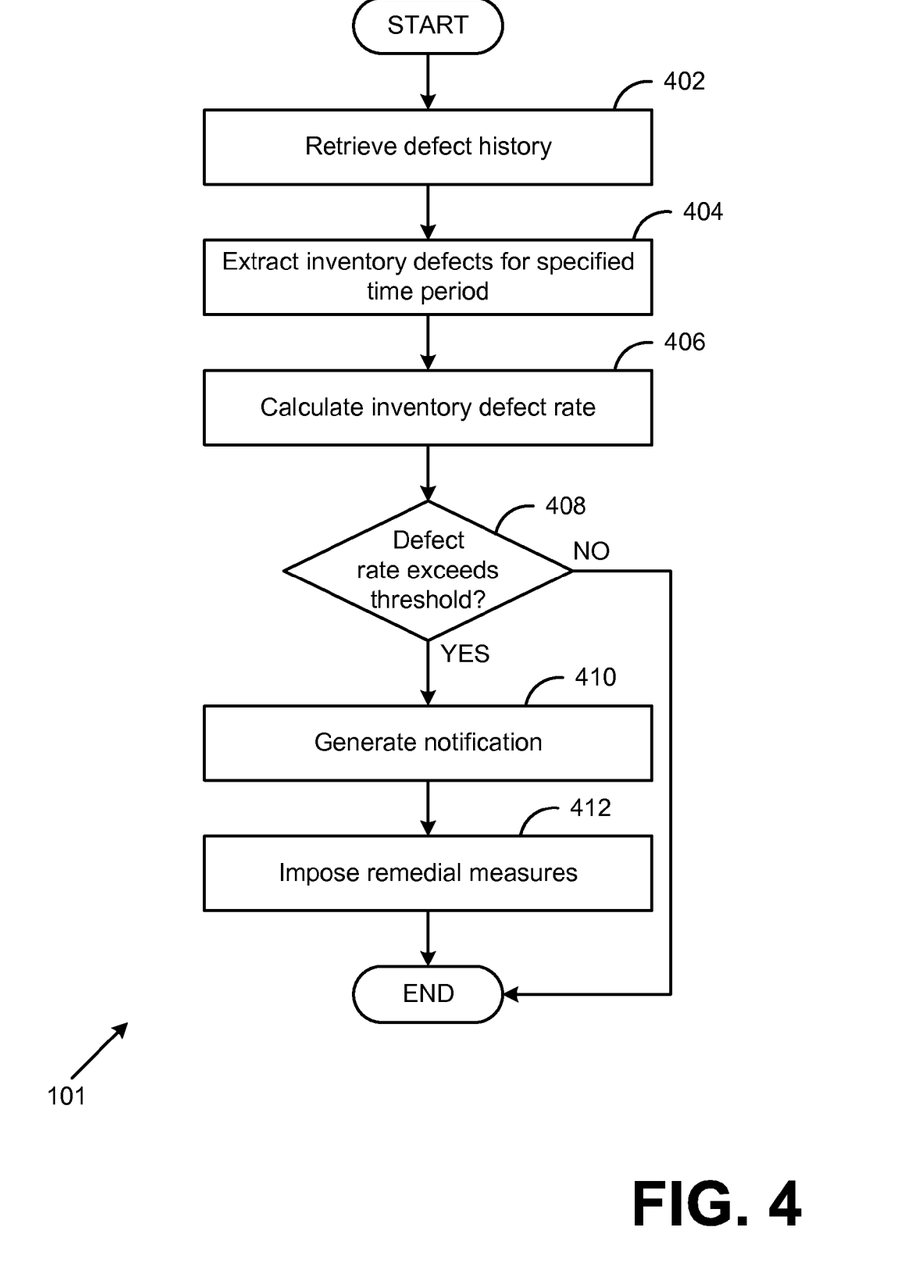
FIG. 4 is a drawing of a process in accordance with an embodiment of the disclosure.

Reference is now made to FIG. 4, which depicts one example of the execution of the andon system 101. The flowchart may also be viewed as depicting steps of a method implemented in accordance with various embodiments of the disclosure. It is understood that the flowchart of FIG. 4 is merely an example of functionality in the andon system 101, and that other functions may be implemented in the andon system 101 as described herein.

In this respect, in box 402, a defect history 155 (FIG. 1) is retrieved from the andon system 101 (FIG. 1). In one embodiment, the defect history 155 can be stored in a data store and the defects stored therein can be associated with a vendor, shipping identifier, product identifier, and/or materials handling facility 100 (FIG. 1) personnel. In box 404, inventory defects can be extracted from the retrieved defect history 155. As noted above, inventory defects can be associated with a vendor and/or materials handling facility 100 personnel.

In box 406, an inventory defect rate is calculated. The inventory defect rate can be calculated with respect to a vendor and/or individual in the materials handling facility 100 over a specified time period. In box 408, it is determined whether the calculated inventory defect rate exceeds a specified threshold associated with the vendor and/or individual. In box 410, if the calculated inventory defect rate exceeds the threshold, a notification is generated and transmitted or encoded for display to a vendor, individual, and/or other entity personnel. As noted above, a notification can be an internal notification 205 (FIG. 2) or an external notification 207 (FIG. 2). In box 412, remedial measures 204 (FIG. 2) can be imposed as described above.

Figure 5:
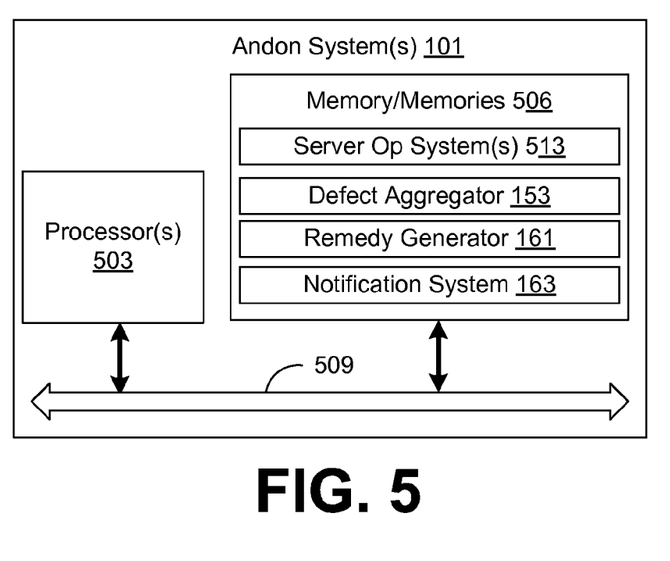
FIG. 5 is a drawing of an andon system in accordance with an embodiment of the disclosure.

With reference to FIG. 5, shown is one example of an andon system 101 that comprises a computer server or equivalent device according to an embodiment of the present disclosure. The andon system 101 can be implemented on a server or other computing system and may include one or more processor circuits having a processor 503 and a memory 506, both of which are coupled to a local interface 509. In this respect, the local interface 509 may comprise, for example, a data bus with an accompanying control/address bus as can be appreciated.

Stored on the memory 506 and executable by the processor 503 are various components such as a server operating system 513, defect aggregator 153, remedy generator 161, notification system 163, and/or others systems. In addition, it is understood that many other components may be stored in the memory 506 and executable by the processor(s) 503. Also, such components may reside in a memory that is external from the andon system 101 as can be appreciated.

As set forth above, a number of components are stored in the memory 506 and are executable by the processor 503. In this respect, the term "executable" refers to a program file that is in a form that can ultimately be run by the processor 503. Examples of executable programs may be, for example, a compiled program that can be translated into machine code in a format that can be loaded into a random access portion of the memory 506 and run by the processor 503, or source code that may be expressed in proper format such as object code that is capable of being loaded into a random access portion of the memory 506 and executed by the processor 503. An executable program may be stored in any portion or component of the memory 506 including, for example, random access memory, read-only memory, a hard drive, compact disk (CD), floppy disk, or other memory components.

The memory 506 is defined herein as both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 503 may represent multiple processors and the memory 506 may represent multiple memories that operate in parallel. In such a case, the local interface 509 may be an appropriate network that facilitates communication between any two of the multiple processors 503, between any processor 503 and any one of the memories 506, or between any two of the memories 506, etc. The processor 503 may be of electrical, optical, or of some other construction as can be appreciated by those with ordinary skill in the art.

The server operating system 513 is executed to control the allocation and usage of hardware resources such as the memory 506 and processing time in the andon system 101. In this manner, the server operating system 513 serves as the foundation on which applications depend as is generally known by those with ordinary skill in the art. In addition, any of the depicted components of FIGS. 1-3 may be implemented in more than one computing system, server, or other device. For example, while data stores may be shown within a corresponding system, it should be appreciated that such a data store may be implemented in a relational database or other type of database on a separate and/or dedicated server.

Although the functionality of various components is described above with respect to FIGS. 1-3 as being embodied in software or code executed by general purpose hardware as discussed above, as an alternative the same may also be embodied in dedicated hardware or a combination of software/general purpose hardware and dedicated hardware. If embodied in dedicated hardware, the functionality of these components can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The flowchart of FIG. 4 shows the functionality and operation of functionality implemented on the andon system 101. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, where the functionality of the disclosed systems is expressed in the form of software or code, it can be embodied in any computer-readable medium for use by or in connection with an instruction execution system such as, for example, a processor in a computer system or other system. In this sense, the functionality may comprise, for example, statements including instructions and declarations that can be fetched from the computer-readable medium and executed by the instruction execution system. In the context of the present disclosure, a "computer-readable medium" can be any medium that can contain, store, or maintain the network page for use by or in connection with the instruction execution system.

The computer readable medium can comprise any one of many physical media such as, for example, electronic, magnetic, optical, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A computer-implemented method, comprising:
   retrieving, by at least one computing device, a defect history associated with a vendor and at least one product from an inbound shipment from a memory, the at least one product to be stocked in a materials handling facility, the defect history being associated with a specified time period;
   extracting, by the at least one computing device, at least one inventory defect from the defect history in the at least one computing device;

calculating, by the at least one computing device, an inventory defect rate in the at least one computing device for the specified time period;

weighting, by the at least one computing device, the at least one inventory defect based on a weighting factor based at least in part upon: a remediation cost associated with a type of the at least one inventory defect, a scarcity of the at least one product associated with the at least one inventory defect, duration of business relationship with the vendor, whether the vendor has promised to correct the at least one inventory defect, and whether the inventory defect rate associated with the vendor over a previous specified time period meets a specified threshold;

assigning, by the at least one computing device, at least one weighted value to the at least one inventory defect wherein calculating the inventory defect rate further comprises calculating a weighted rate from the at least one weighted value assigned to the at least one inventory defect;

imposing, by the at least one computing device, at least one remedial measure if the inventory defect rate meets the specified threshold of the inventory defect rate, wherein the inventory defect rate is associated with the vendor and the at least one remedial measure is imposed on the vendor, the at least one remedial measure comprising generating a warning message including information describing the at least one inventory defect, the information including at least one of an inventory defect type, a date, or a vendor identifier associated with the vendor;

imposing, by the at least one computing device, at least one additional remedial measure including lowering the specified threshold for a subsequent time period;

generating, by the at least one computing device, a corrective message, the corrective message instructing how the at least one inventory defect can be corrected; and transmitting, by the at least one computing device, the warning message to the vendor and the corrective message to personnel in the materials handling facility.

2. A computer-implemented method, comprising:

retrieving, by at least one computing device, a defect history associated with a vendor and at least one product from an inbound shipment from a memory, the at least one product to be stocked in a materials handling facility, the defect history being associated with a specified time period;

extracting, by the at least one computing device, at least one inventory defect from the defect history in a computer system;

calculating, by the at least one computing device, an inventory defect rate in the computer system for the specified time period;

imposing, by the at least one computing device, at least one remedial measure when the inventory defect rate meets a specified threshold of the inventory defect rate, the inventory defect rate being associated with at least one of an individual in the materials handling facility or the vendor, the at least one remedial measure being imposed on at least one of the individual or the vendor, wherein the at least one remedial measure comprises reducing the specified time period for a subsequent calculation of the inventory defect rate;

generating, by the at least one computing device, a warning message including at least one of: information describing the at least one inventory defect, the information including an inventory defect type, a date or a vendor identifier associated with the vendor;

generating, by the at least one computing device, a corrective message, the corrective message instructing how the at least one inventory defect can be corrected; and transmitting, by the at least one computing device, the corrective message to personnel in the materials handling facility and the warning message to the vendor.

3. The computer-implemented method of claim 2, wherein the at least one inventory defect comprises at least one of: an inaccurate count of inventory in the inbound shipment and lost inventory from the inbound shipment.

4. The computer-implemented method of claim 2, further comprising imposing, by the at least one computing device, additional remedial measures on the vendor if the vendor does not correct the at least one inventory defect.

5. The computer-implemented method of claim 4, wherein the additional remedial measures further comprises at least one of: ceasing acceptance at the materials handling facility of inbound shipments from the vendor, restricting quantity of products ordered from the vendor, or restricting inbound shipments from the vendor to a particular materials handling facility.

6. The computer-implemented method of claim 2, further comprising:

weighting, by the at least one computing device, the at least one inventory defect based on a weighting factor;

assigning, by the at least one computing device, at least one weighted value to the at least one inventory defect; and wherein calculating the inventory defect rate further comprises calculating, by the at least one computing device, a weighted rate from the at least one weighted value assigned to the at least one inventory defect.

7. The computer-implemented method of claim 6, wherein the weighting factor is based on at least one of: a remediation cost associated with a type of the at least one inventory defect, a scarcity of the at least one product associated with the at least one inventory defect, duration of business relationship with the vendor, whether the vendor has promised to correct the at least one inventory defect, or whether a first inventory defect rate associated with the vendor or a previous specified time period exceeds the specified threshold.

8. The computer-implemented method of claim 2, wherein imposing at least one remedial measure further comprises generating, by the at least one computing device, a message in the computer system instructing at least one of: the materials handling facility to cease acceptance of future inbound shipments from the vendor, a procurement system to cease ordering of products from the vendor, or the procurement system to restrict quantity of products ordered from the vendor.

9. The computer-implemented method of claim 8, further comprising interfacing, by the at least one computing device, with the procurement system to cause the procurement system to cease ordering of products from the vendor.

10. The computer-implemented method of claim 2, wherein the at least one inventory defect is at least one of: a missing barcode, a missing purchase order identifier associated with the inbound shipment, late arriving inventory, a quantity discrepancy between a first quantity of items in the inbound shipment and a second quantity expected to be present in the inbound shipment, at least one damaged product in the inbound shipment, or a user generated inventory defect data.

11. The method of claim 2, wherein the at least one inventory defect comprises a missing universal product code label for the at least one product and imposing at least one remedial measure further comprises initiating creation of a replacement universal product code label.

12. A system, comprising:

at least one server;

logic executed on the at least one server that retrieves a defect history associated with a vendor and at least one product from an inbound shipment from a memory, the at least one product to be stocked in a materials handling facility, the defect history being associated with a specified time period;

logic executed on the at least one server that extracts at least one inventory defect from the defect history in a computer system and calculates an inventory defect rate in the computer system for the specified time period;

logic executed on the at least one server that imposes remedial measures if the inventory defect rate exceeds a specified threshold of the inventory defect rate, wherein the inventory defect rate is associated with the vendor and the remedial measures are imposed on the vendor, the remedial measures comprising reducing the specified time period for a subsequent calculation of the inventory defect rate;

logic that generates a warning message including at least one of: information describing the at least one inventory defect, the information including an inventory defect type, a date or a vendor identifier associated with the vendor;

logic that generates a corrective message, the corrective message instructing how the at least one inventory defect can be corrected; and logic that transmits the corrective message to personnel in the materials handling facility and the warning message to the vendor.

13. The system of claim 12, further comprising logic executed on the at least one server that imposes additional remedial measures on a vendor if the vendor does not correct the at least one inventory defect.

14. The system of claim 13, wherein the additional remedial measures further comprises at least one of: ceasing acceptance at the materials handling facility of inbound shipments from the vendor, restricting quantity of products ordered from the vendor, or restricting inbound shipments from the vendor to a particular materials handling facility.

15. The system of claim 12, further comprising logic executed on the at least one server that lowers the specified threshold for a subsequent time period.

16. The system of claim 12, further comprising:

logic executed on the at least one server that weighs the at least one inventory defect based on a weighting factor;

logic executed on the at least one server that assigns at least one weighted value to the weighted at least one inventory defect; and logic executed on the at least one server that calculates a weighted rate from the at least one weighted value assigned to the at least one inventory defect.

17. The system of claim 16, wherein the weighting factor is based on at least one of: a remediation cost associated with a type of the at least one inventory defect, a scarcity of the at least one product associated with the at least one inventory defect, duration of business relationship with the vendor, whether the vendor has promised to correct the at least one inventory defect, or whether a first inventory defect rate associated with the vendor and a previous specified time period exceeds the specified threshold.

18. The system of claim 12, further comprising logic executed on the at least one server that generates a message in the at least one server instructing at least one of the materials handling facility to cease acceptance of future inbound shipments from the vendor, a procurement system to cease ordering of products from the vendor, or the procurement system to restrict quantity of products ordered from the vendor.

19. The system of claim 18, further comprising logic executed on the at least one server that interfaces with the procurement system to cause the procurement system to cease ordering of products from the vendor.

20. The system of claim 12, wherein the at least one inventory defect is at least one of: a missing barcode, late arriving inventory, a missing purchase order identifier associated with the inbound shipment, a quantity discrepancy between a first quantity of items in the inbound shipment and a second quantity expected to be present in the inbound shipment, at least one damaged product in the inbound shipment, or a user generated inventory defect data.

21. The system of claim 12, wherein the at least one inventory defect comprises a missing universal product code label for the at least one product and the logic that imposes remedial measures further comprises logic that initiates generation of a replacement universal product code label.

* * * * *